Feb. 4, 1936.　　　　　E. V. RODGERS　　　　2,029,390
WATERPROOFED PLASTIC PAPER AND METHOD OF PRODUCING THE SAME
Filed June 8, 1933
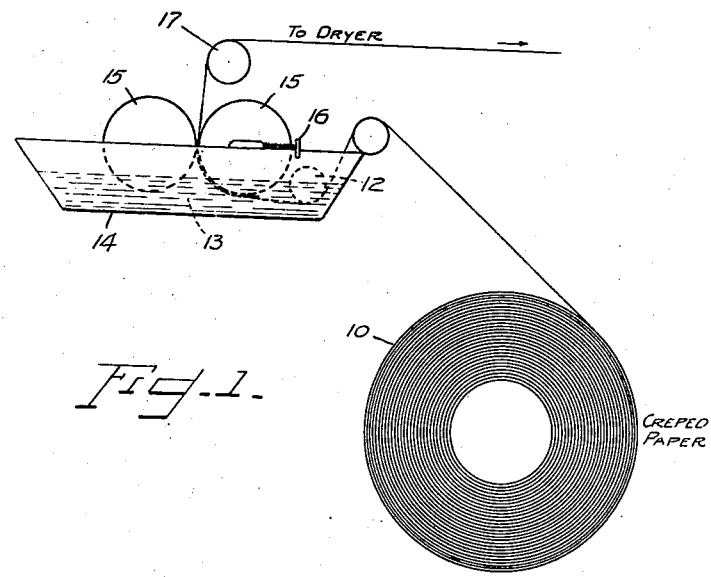
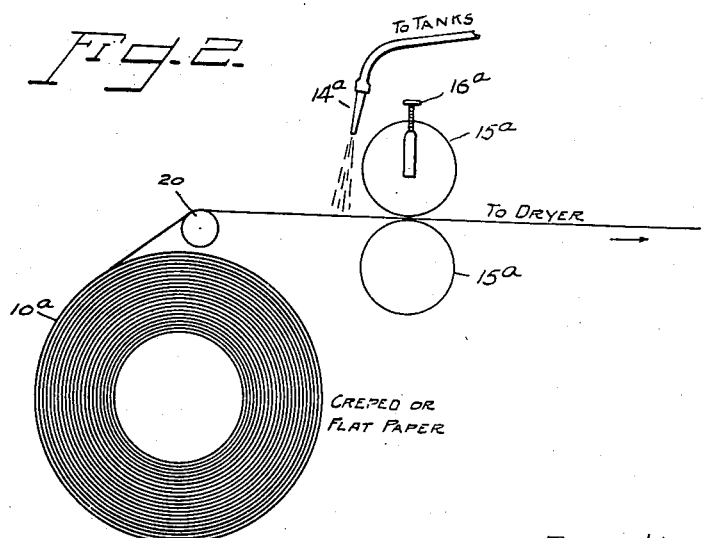
EARLE V. RODGERS
INVENTOR
BY
his ATTORNEY Patented Feb. 4, 1936

2,029,390

UNITED STATES PATENT OFFICE 2,029,390

WATERPROOFED PLASTIC PAPER AND METHOD OF PRODUCING THE SAME

Earle V. Rodgers, Kenilworth, N. J.

Application June 8, 1933, Serial No. 674,822

4 Claims. (Cl. 91—68)

My invention relates to waterproofed plastic paper and to methods of producing the same.

The waterproofed plastic paper of my invention is applicable to a great many uses, among which may be mentioned (a) wrapping or packing paper for articles readily affected by or containing moisture, (b) candy and chewing gum wrappers, etc.

In preparing my waterproofed plastic paper I may start either with creped or flat paper, the final product in either case being a creped waterproofed product.

I will first describe the method when creped paper is the starting material. The creped paper is coated with a lacquer or coating containing pigments and waterproofing materials, the application of the coat of lacquer being effected by any approved coating or lithographic process.

The pigments are used to determine or impart color, opacity and weight, and among the pigments which I may employ are minerals, metals, salts of metals and the like, such as lead oxide, antimony oxide, ferrous oxide, barium sulphate, copper sulphate, French chalk, hydrated lime, pulverized marble and zinc sulphide.

The preferred waterproofing material is one selected from the stearate group, such as calcium, zinc and aluminum.

A specific example of this form of my improved method consists in passing the creped paper through a bath made up of the following ingredients in the quantities indicated or multiples thereof—

| | |
|---|---|
| Elemi gum | ¼ lb. |
| ½ second nitrocellulose | ½ lb. |
| Blown castor oil | 2 oz. |
| Toluol | 2 pts. |
| Isopropyl acetate | 6 pts. |
| Calcium stearate (per gal. of bath) | 12 oz. |
| Antimony oxide (per gal. of bath) | 2 lbs. |

The bath is prepared by dissolving the Elemi gum in the toluol, dissolving the nitrocellulose in the acetate, mixing the two solutions together and then adding the oil, stearate and oxide. The castor oil functions as a plasticizer and may be replaced by any other plasticizer common to the art.

After leaving the bath the treated paper is run between cooperating squeeze rolls, the distance between which is adjusted to leave the desired thickness of coating on the paper, and thereafter the paper is dried and wound on a reel. If the article to be wrapped in the paper contains corners or an inequality in all directions the paper is desirably corrugated or embossed.

When flat paper is used as the starting material, the paper is unwound from a roll and run through a coater of the leather or lithographic type, containing a bath made up as described above, thus coating the paper on one face. Thereafter the paper is dried and rewound. Then the paper is passed through the creping machine with the uncoated side engaging the creping cylinder, producing a creped paper coated on one side or face, whereupon the paper is dried and rewound. To finish the product, the paper is again passed through the coating machine to apply the lacquer to the then still uncoated paper face, and the paper is dried and rewound thus rendering it ready for use. This paper may be corrugated or embossed, as previously described.

It will be understood that any paper of any weight, cylinder or Foudrinier, may be used as the basis. I preferably employ paper of 25 to 30 pounds basis, 24 x 36—480 sheets to the ream, of uniform thickness and density.

I have indicated above that the lacquer solution is applied to the paper by passing the latter through a bath containing such solution but I desire to point out that the solution may be sprayed on the paper with substantially equally satisfactory results.

Any suitable apparatus may be used for practicing my improved method, and such apparatus forms no part of my invention. Merely by way of illustration I have shown two forms of apparatus in fragmentary form, in the accompanying drawing in which Fig. 1 is a diagrammatic view of parts of an apparatus for passing creped paper through a bath and Fig. 2 is a similar view of parts of an apparatus for spraying the lacquer solution on the paper which initially may be either creped or uncreped.

In Fig. 1, the roll of creped paper is denoted 10. From the roll the paper passes over and under guide rolls 11 and 12 through the waterproofing bath 13 in the tank 14, out between the squeeze rolls 15 the distance between which may be varied by the adjusting mechanism 16, thence over the guide roll 17 to the dryer (not shown).

In Fig. 2, the roll of paper, which may be either flat or creped is denoted 10a. If the paper is flat it is first passed over the creping roller 20, while if the paper constituting the roll 10a is creped the roller 20 is omitted. In this form of apparatus the squeeze rolls 15a are vertically superimposed and the distance between them is regulated by the adjusting device 16a. In advance of the squeeze rolls a spray nozzle 14a discharges a stream of the waterproofing solution from a tank (not shown) onto the paper prior to its passage between the rolls 15a, and the paper passes thence to the dryer not shown. When using the apparatus of Fig. 2 first one face and then the other of the paper is coated, while with a type of apparatus as shown in Fig. 1 both faces are simultaneously coated.

It is desirable that the creping ratio, which is the relation between the flat paper before and after being creped, and which is determined by the relative surface speeds of the creping cylinder and take-up means for the creped paper, be suited to the article to be wrapped so that the waterproofed plastic paper will conform to the inequalities of the surface of the article. A fair average creping ratio is 50%.

The waterproofed plastic paper of my invention is non-elastic but capable of stretching to conform to uneven surfaces and retaining its conformed condition in the presence of moisture or even if submerged in liquid. The degree of waterproofness may be regulated by the quantity of stearate used in the bath, so that, while the paper may be made absolutely impervious to liquid, it will absorb liquid without losing its conformation and, if glued to an object, may be washed off therefrom.

I claim:—

1. The method of producing a waterproofed plastic product, which comprises treating creped paper with a non-aqueous solution containing a pigment and a stearate and an organic solvent.

2. The method of producing a waterproofed plastic product, which comprises treating creped paper with a non-aqueous solution containing a pigment, a stearate, a plasticizer and an organic solvent.

3. The method of producing a waterproofed plastic product which comprises treating creped paper with a solution consisting of Elemi gum, nitrocellulose, blown castor oil, toluol, isopropyl acetate, calcium stearate, antimony oxide and an organic solvent.

4. The method of producing a waterproofed plastic product which comprises treating one face of flat paper with a non-aqueous solution containing a pigment and a stearate, drying said paper, creping said paper, and thereafter treating the other face of said paper with a non-aqueous solution containing a pigment and a stearate in an organic solvent.

EARLE V. RODGERS.